United States Patent [19]

Lin et al.

[11] Patent Number: 5,576,110
[45] Date of Patent: Nov. 19, 1996

[54] ADDITION CURABLE SILICONE PSA WITH HIGH LAP SHEAR STRENGTH

[75] Inventors: Shaow B. Lin, Schenectady; Robert C. Rowland, Albany, both of N.Y.

[73] Assignee: General Electric Company, Waterford, N.Y.

[21] Appl. No.: 449,871

[22] Filed: May 25, 1995

Related U.S. Application Data

[63] Continuation of Ser. No. 206,489, Mar. 4, 1994, abandoned.

[51] Int. Cl.$^6$ .............................. B32B 9/06; C08F 283/12
[52] U.S. Cl. ............................................. 428/447; 525/478
[58] Field of Search ............................... 525/478; 428/447

[56] References Cited

U.S. PATENT DOCUMENTS

| | | | |
|---|---|---|---|
| 3,983,298 | 9/1976 | Hahn et al. | 428/355 |
| 4,774,297 | 9/1988 | Murakami et al. | 525/478 |
| 4,988,779 | 1/1991 | Medford et al. | 525/478 |
| 5,169,727 | 12/1992 | Boardman | 428/447 |
| 5,190,827 | 3/1993 | Lin | 428/447 |
| 5,254,644 | 10/1993 | Kobori et al. | 525/478 |
| 5,292,586 | 3/1994 | Lin et al. | 428/355 |

FOREIGN PATENT DOCUMENTS

| | | |
|---|---|---|
| 20355991 | 2/1990 | European Pat. Off. . |
| 0355991 | 2/1990 | European Pat. Off. . |
| 0393426A | 10/1990 | European Pat. Off. . |
| 0506370A | 9/1992 | European Pat. Off. . |
| 0506372A | 9/1992 | European Pat. Off. . |
| 0506371A | 9/1992 | European Pat. Off. . |
| 0581539 | 2/1994 | European Pat. Off. . |
| 581539 | 2/1994 | European Pat. Off. . |
| 1940124 | 5/1984 | Germany . |
| 2277933 | 11/1994 | United Kingdom . |

*Primary Examiner*—Margaret W. Glass
*Attorney, Agent, or Firm*—Kenneth S. Wheelock

[57] ABSTRACT

An addition curable silicone pressure sensitive adhesive composition having high lap shear strength particularly at elevated temperatures is described; containing (A) an aromatic soluble, MQ resin or resinous copolymer having $R_3SiO_{1/2}$ and $SiO_{4/2}$; (B) an alkenyl-containing polydiorganosiloxane having a viscosity of at least about 3,000 centipoise at 25° C.; (C) a set of multi-functional silicones as crosslinkers; (D) from 0 to about 100 parts by weight of a reaction mixture containing from 60 to 100 parts by weight of Component (A) and from about 40 to 0 parts by weight of Component (B); (E) a hydrosilylation catalyst; and optionally (F) from 0 to about 40% by weight of an organic solvent.

18 Claims, No Drawings

ADDITION CURABLE SILICONE PSA WITH HIGH LAP SHEAR STRENGTH

This is a continuation of copending application Ser. No. 08/206,489 filed on Mar. 4, 1994, now abandoned.

CROSS REFERENCE TO RELATED APPLICATIONS

Reference is made to concurrently pending application U.S. Ser. No. 08/645,932 filed May 14, 1996 which is a file wrapper continuation of U.S. Ser. No. 08/445,269 filed May 19, 1995, now abandoned, which is a file wrapper continuation of U.S. Ser. No. 08/206,497 filed Mar. 4, 1994, now abandoned; and concurrently pending application U.S. Ser. No. 08/630,224 filed Apr. 10, 1996 which is a file wrapper continuation of U.S. Ser. No. 08/396,373 filed Feb. 28, 1995, now abandoned, which is a file wrapper continuation of U.S. Ser. No. 08/206,483 filed Mar. 4, 1994 now abandoned.

BACKGROUND OF THE INVENTION

The present invention relates to silicone compositions suitable for forming pressure sensitive adhesive compositions. More particularly, the present invention relates to addition curable silicone compositions which cure to form pressure sensitive adhesives compositions having high lap shear strength.

The term "pressure sensitive adhesives" (PSA) as used herein refers to adhesives that can be adhered to a surface and yet can be removed from the surface without transferring more than trace quantities of adhesive to the surface, and can be readhered to the same or another surface because the adhesive retains some or all of its tack and adhesive strength.

Silicone pressure sensitive adhesives have excellent adhesive strength, tack, and cohesive strength, which are generally the properties required of a pressure sensitive adhesive. Silicone PSA tapes are used in many high temperature and chemically harsh industrial operations, such as plater's masking tapes, high shear splicing tapes, plasma and flame spraying, and the like. In order to be useful in these types of applications, silicone PSA's must exhibit high lap shear strength, particularly at elevated temperatures.

A drawback associated with currently available silicone PSA's is the lack of high lap strength in combination with high peel and tack, especially at high temperatures.

Addition-curable silicone compositions capable of curing to form pressure sensitive adhesive compositions are known in the art.

U.S. Pat. No. 5,169,727 (Boardman) is directed to a pressure sensitive adhesive composition having high solids content comprising (a) a benzene soluble resinous copolymer consisting of R'R"R'"SiO$_{1/2}$ units SiO$_{4/2}$ units and containing silicon-bonded hydroxyl radicals ranging from 1 to 4 percent by weight of the copolymer, (b) a diorganoalkenylsiloxy endblocked polydiorganosiloxane, (c) a diorganohydrogensiloxy end-blocked polydiorganosiloxane, (d) a crosslinking agent, and (e) a hydrosilylation catalyst. Boardman requires an organosiloxane crosslinker having 1 to 15 silicone atoms. Further, the examples presented in Boardman show the pressure sensitive adhesives prepared had low to moderate tack properties. The adhesive strength ranged from poor to passing as measured by holding power at 70° C. There is no teaching of a PSA with improved lap shear properties, no teaching of improved lap shear properties at high temperature, and no teaching of obtaining useful pressure sensitive adhesive properties at SiH/Si-Vinyl ratios of greater than 1.25:1.

U.S. Pat. No. 3,883,298 (Hahn et. al.) is directed to a composition useful as a pressure sensitive adhesive, obtained by mixing components consisting essentially of (a) from 50 to 60 parts by weight of a solid, benzene soluble resin copolymer consisting essentially of R$_3$SiO$_{1/2}$ units and SiO$_{4/2}$ units, (b) from 40 to 50 parts by weight of an essentially cyclic free vinyl-terminated polydiorganosiloxane having a viscosity of from 20,000 to 100,000 centipoise at 25° C., (c) a hydrogen-containing organopolysiloxane in an amount sufficient to provide from 1.0 to 20.0 silicon-bonded hydrogen atoms of every olefinically unsaturated radical in the total of (a) plus (b) and (d) a platinum catalyst. It is pointed out in Hahn that compositions of the prior art containing MQ resins mixed with low viscosity polydiorganosiloxanes do not form PSA's.

U.S. Pat. No. 4,774,297 (Murakami et al) is directed to a composition suitable for forming a pressure sensitive adhesives having excellent tack and adhesive strength comprising (A) 30–70 parts by weight of a vinyl-terminated polydiorganosiloxane having a viscosity of at least 500,000 centipoise at 25° C., (B) 70–30 parts by weight of an organopolysiloxane containing R$_3$SiO$_{1/2}$ units and SiO$_{4/2}$ units, (C) an organohydrogensiloxane in an amount sufficient to provide 1–20 silicon-bonded hydrogen atoms per alkenyl group, (D) a platinum-containing catalyst, and (E) from 25–400 parts by weight of an organic solvent. In order to obtain a satisfactory product, Murakami et al teach that it is essential that the vinyl polymer have a viscosity of at least 500,000 centipoise and preferably at least one million centipoise at 25° C.

U.S. Pat. No. 4,988,779 (Medford et al) discloses a composition suitable for forming a pressure sensitive adhesive, the composition having a solvent content of no more than 5–10% by weight and comprising from 30 to 50 parts of a vinyl-containing polydiorganosiloxane fluid having a viscosity of from 500 to 10,000 centipoise at 25° C., from 50 to 70 parts of a benzene soluble resin copolymer containing R$_3$SiO$_{1/2}$ units and SiO$_{4/2}$ units, an organopolysiloxane having silicon bonded hydrogen atoms, and a platinum catalyst. The hydrogen-containing organopolysiloxane of the formula R$^3_a$H$_b$SiO$_{(4-a-b)/2}$, is present in an amount sufficient to provide from 1.0 to 30.0 silicon-bonded hydrogen atoms for every olefinically unsaturated radical in the composition. The hydrogen-containing organopolysiloxane functions as a cross-linker and has a small structure with a=1.00–less than 2.00, b=0.05–1.00, a+b=1.10 to less than 3.00. There is no teaching of using higher molecular weight hydride crosslinker to give better peel and tack properties. The peel adhesion of the cured adhesive was controlled by controlling the amount of MQ resin and not by the crosslinker. There is no teaching of obtaining high lap shear strength in combination with high peel and tack adhesive properties.

U.S. Pat. No. 5,190,827 (Lin) is directed to a composition having high solids content and having a hydrogen-containing polydiorganosiloxane containing more than 2 silicon-bonded hydrogen atoms per chain. Other components in the composition include an MQ resin, an alkenyl-terminated silicone fluid, and a hydride-terminated silicone fluid. The cross linking that occurs is only through the hydride crosslinker which is selected from linear or resinous siloxane polymers, and no organosiloxane containing more than 2 silicone-bonded alkenyl groups as a crosslinker is disclosed.

U.S. Pat. No. 5,292,586 (Lin et al.) discloses a composition comprising a silanol-containing MQ resin, an alkenyl-terminated polydiorganosiloxane, a hydride-terminated organohydrogenpolysiloxane and a catalytic amount of a hydrosilylation catalyst. The composition cures to form a PSA having high peel and tack adhesion properties, but does not contain any cross linker or multifunctional alkenyl or multifunctional hydride silicones. The terminal hydride adhesive network reacts with silanol of the MQ resin to form an internally cured adhesive network.

U.S. patent application Ser. No. 08/150,570 (Lin et al.), now abandoned, discloses an addition cured adhesive composition having high solids content. The composition is prepared from a multifunctional vinyl-containing silicone as crosslinker, in addition to MQ resin, an alkenyl-terminated silicone fluid, a hydride-terminated silicone fluid and a hydrosilylation catalyst. The cross-linking occurs through the external vinyl-crosslinker and forms the cured pressure sensitive adhesive. There is no teaching of preparing PSA's with improved lap shear strength in combination with high peel and tack adhesive properties.

It is continually desirable to provide addition-curable polydiorganosiloxane compositions which cure to yield silicone pressure sensitive adhesives having high solids content and improved lap shear properties, particularly at elevated temperatures. It is also desirable to have a composition which can provide these properties without the presence of any solvent.

In the present invention, it was found that an addition curable silicone composition containing an alkenyl-containing diorganopolysiloxane having a viscosity of at least 3,000 cps or higher at 25° C., can be cured to form pressure sensitive adhesives with excellent peel and probe tack adhesive properties, as well as high lap shear strength, particularly at elevated temperatures.

SUMMARY OF THE INVENTION

The present invention is directed to an addition curable silicone pressure sensitive adhesive composition which cures to form pressure sensitive adhesives having high lap shear strength particularly at elevated temperatures, comprising:
(A) from about 50 to about 75 parts by weight of an aromatic soluble resin or resinous copolymer comprising $R_3SiO_{1/2}$ units and $SiO_{4/2}$ units wherein each R is independently a monovalent hydrocarbon radical having from 1 to about 6 carbon atoms, wherein the resinous copolymer comprises from about 0.2% to about 5.0% by weight, based on the total weight of the copolymer, of hydroxyl radicals, at least 95% of all R groups being an alkyl group, the molar ratio of $R_3SiO_{1/2}$ to $SiO_{4/2}$ being from about 0.6 to about 0.9 inclusive;
(B) an alkenyl-containing polydiorganosiloxane having a viscosity of at least about 3,000 centipoise at 25° C.;
(C) a hybrid crosslinker comprising:
  (i) a multi-functional hydrogen-containing organosiloxane having more than 2 silicon-bonded hydrogens per chain; and
  (ii) a multi-functional alkenyl-containing organosiloxane having more than 2 silicon-bonded alkenyl groups per chain; with the proviso the total of (B), (C)(i) and (C)(ii) is from about 25 to about 50 parts by weight; the total of (A), (B), (C)(i) and (C)(ii) is 100 parts by weight;
(D) from 0 to about 100 parts by weight of a reaction mixture comprising from 60 to 100 parts by weight of Component (A) and from about 40 to 0 parts by weight of Component (B);
(E) a hydrosilylation catalyst; and optionally (F) from 0 to about 40% by weight of an organic solvent.

The composition of the present invention cures to form a pressure sensitive adhesive having a lap shear strength greater than 2.2 pounds per square inch @ 70° C., and preferably greater than 2.2 pounds per square inch @ 150° C. Solvent can be present in the composition, although it is not required to improve the workability in the uncured state, thus, permitting the composition to be described as 100% solids. A key benefit of this invention is that a PSA having high lap shear strength is produced and retains its' lap shear strength at high temperatures.

DETAILED DESCRIPTION OF THE INVENTION

Component (A) of the composition of the present invention is an aromatic-soluble resin or resinous organopolysiloxane copolymer which imparts peel adhesion and tack to the cured pressure sensitive adhesive prepared from the composition. The resin or resinous copolymer (A) comprises $R_3SiO_{1/2}$ units (also known as "M" units) and $SiO_{4/2}$ units (also known as "Q" units) wherein each R is independently a monovalent hydrocarbon radical having from 1 to about 6 carbon atoms. Examples of radicals represented by R include alkyl radicals such as methyl, ethyl, and isopropyl; cycloaliphatic radicals such as cyclopentyl and cyclohexanyl; olefinic radicals, such as vinyl and allyl; and the phenyl radical. At least 95% of all R groups are alkyl groups, preferably methyl. The molar ratio of $R_3SiO_{1/2}$ units to $SiO_{4/2}$ units is from about 0.6 to about 0.9 inclusive. The resin or resinous copolymer comprises from about 0.2% to about 5% and preferably from about 1.0 to about 3.0% and most preferably from about 1.5% to about 2.5%, by weight based on the total weight of the resin or copolymer, of hydroxyl radicals. The hydroxyl radicals are bonded directly to the silicon atom of the $SiO_{4/2}$ units or of the $R_3SiO_{1/2}$ units or some of the hydroxyl radicals can be bonded directly to the silicon atom of the $SiO_{4/2}$ units and some of the hydroxyl radicals can be bonded directly to the silicon atom of the $R_3SiO_{1/2}$ units.

Component (A) is present in the composition of this invention in an amount within the range of from about 50 to about 75, preferably from about 50 to about 70, and most preferably from about 50 to about 62, parts by weight.

Methods for making the resin or resinous copolymer (A) are known in the art. Reference is made, for example, to U.S. Pat. No. 2,676,182 to Daudt et al., which is hereby incorporated by reference. In the Daudt et al. method, a silica hydrosol is reacted under acidic conditions with a source of triorganosiloxy units such as a hexaorganodisiloxane, e.g., hexamethyldisiloxane, or a hydrolyzable triorganosilane, e.g., trimethylchlorosilane, or mixtures thereof, and recovering a benzene soluble resin copolymer having M and Q units.

The resin or resinous copolymer (A) is preferably a solid, resinous material and is most often available as a solution in a solvent such as xylene or toluene, generally as a 40% to 65% by weight solution.

Component (B) of the composition of the present invention is preferably an alkenyl-containing polydiorganosiloxane having a viscosity of at least 3,000 cps or higher at 25° C. and having the general formula $$R^1{}_2R^2SiO(R^1{}_2SiO)_x(R^1R^3SiO)_ySiR^2R^1{}_2 \qquad (I)$$

wherein each $R^1$ is independently an alkyl group having from 1 to 10 carbon atoms such as methyl, ethyl, and propyl;

an cycloaliphatic group such as cyclohexanyl or an aryl group such as phenyl; $R^2$ is an alkenyl group having from 1 to about 10 carbon atoms including α-alkenyls such as vinyl, allyl, propenyl, butenyl, pentenyl, hexenyl or the like; $R^3$ is either $R^1$ or $R^2$. The sum of x and y is at least about 520 to give a viscosity of about 3,000 cps at 25° C. The preferred component (B) of the present invention is alkenyl-containing polydimethylsiloxane, alkenyl-containing poly(dimethyl-co-diphenyl) siloxane, and alkenyl-containing poly-(dimethyl-co-methylphenyl) siloxane. Preferably the alkenyl group is vinyl.

The viscosity of the alkenyl-containing polydiorganosiloxane (B) is at least 3,000 cps or greater, and preferably at least 10,000 centipoise at 25° C.

Alkenyl-containing polydiorganosiloxanes (B) can be prepared by any conventional methods for preparing triorganosiloxane-terminated polydiorganosiloxanes. For example, a proper ratio of the appropriate hydrolyzable silanes, e.g., vinyldimethylchlorosilane and dimethyldichlorosilane, may co-hydrolyzed and condensed or alternately an appropriate 1,3-divinyltetraorganodisiloxane, e.g., symmetrical divinyldimethyldiphenylsiloxane or divinyltetramethylsiloxane, which furnishes the endgroups of the polydiorganosiloxane, may be equilibrated with an appropriate diorganopolysiloxane, e.g., octamethylcyclotetrasiloxane, in the presence of an acidic or basic catalyst. Regardless of the method of preparation of polydiorganosiloxane (B), there is usually coproduced a varying quantity of volatile, cyclic polydiorganosiloxanes. Volatile cyclic polydiorganosiloxane, e.g., methyl tetramer, should be removed, since they are volatile and adversely affect pressure sensitive adhesive properties.

The amount used of polydiorganosiloxane (B), its formula (presented hereinabove as formula (I), and its viscosity, for the purposes of this invention, refers to the essentially cyclic free portion of the polydiorganosiloxane. This essentially cyclic free portion can be prepared by stripping the polydiorganosiloxane at 150° C. for 3 hours to yield a residue. This residue will be essentially free of cyclic material with the exception of trace quantities of macrocyclic polydiorganosiloxanes which are non-volatile at 150° C. and atmospheric pressure. Many of these polydiorganosiloxanes (B) are commercially available. Furthermore, component (B) can be homopolymers or copolymers or their several mixtures as long as they are alkenyl-containing polysiloxanes of formula (I).

The terminal units of the preferred form of component (B) are triorganosiloxane units in which one of the organic groups is a vinyl group that is bonded directly to the silicon atom of the terminal unit. The two $R^2$ radicals in each on-chain unit of (B) are any of the $R^1$ radicals defined above, but are preferably selected from the group consisting of methyl and phenyl. Preferred terminal units for siloxane (B) are vinyldimethylsiloxy units.

The polymer chain of the preferred form of polydiorganosiloxane (B), exclusive of terminal units, is made up of diorganosiloxane units containing R1 and R3 radicals which can all be identical or a mixture of R1 and R3 radicals. Trace amounts of $R^1_3SiO_{1/2}$ units, $R^1SiO_{3/2}$ units and $SiO_{4/2}$ units are permissible in (B). Preferably, $R^1$ is selected from the group consisting of methyl, ethyl, propyl, and phenyl. Preferably, $R^3$ radical is selected from $R^1$ as described above or $R^2$, an alkenyl group having from 1 to 10 carbon atoms including α-alkenyls such as vinyl, allyl, propenyl, and hexenyl or the like. The presence of alkenyl radicals on the polymer chain is the preferred form of component (B). One possible mechanism thought to occur is that the alkenyl radicals provide a reactive site for branching or cross-linking through hydrosilylation with silicon-bonded hydride groups of the component (C)(i) in the present invention. The value of y is not critical. At least two alkenyl groups per chain is required of component (B) of the present invention for formation of cured adhesives with appropriate properties.

The value of the sum of x and y is such that the viscosity of component (B) is at least 3,000 centipoise when measured at 25° C. Depending on the type of $R^1$ radicals in component (B) the permissible average value of the sum of x and y is at least about 520.

The amount used of polydiorganosiloxane (B) is an amount sufficient to result in the total of component (B), (C)(i) and (C)(ii) being from about 25 parts to about 50 parts by weight of the total of components (A), (B), (C)(1), and (C)(ii).

Component (C) is a hybrid cross-linker comprising:

(i) a multi-functional hydrogen-containing organosiloxane having more than 2 silicon-bonded hydrogens per chain, and (ii) a multi-functional alkenyl-containing organosiloxane having more than 2 silicon-bonded alkenyl groups per chain.

The total of Component (B), Component (C)(i) and Component (C)ii is from about 25 to about 50 parts by weight; with the total of Components (A), (B), (C)(i) and (C)(ii) representing 100 parts by weight; with at least 15 mole percent or higher of the total hydrosilylation-reactive groups in the composition in either SiH or alkenyl groups being provided for by (C)(i) and (C)(ii); and the ratio of total silicon-bonded hydride to total silicon-bonded alkenyl groups being from about 1.1 to about 15.

Component (C)(i) is a hydrogen-containing organosiloxane containing more than 2 silicon-bonded hydrogens per chain. Examples of Component (C)(i) include (1)linear hydrogen-containing polydiorganosiloxane fluids having a viscosity of form about 5 to about 12,000, preferably from about 5 to about 5000, and most preferably from about 5 to about 2500, centipoise at 25° C. having the general formula $$R^5(R^4)_2SiO((R^4)_2SiO)_y(HR^4SiO)_zSi(R^4)_2R^5 \qquad (II)$$

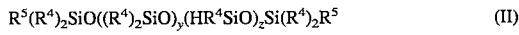

wherein $R^4$ is an alkyl radical having from about 1 to about 10 carbon atoms or an aryl radical; $R^5$ is either H or $R^4$; y is a number in the range of from about 0 to about 800, preferably from about 20 to about 400, and most preferably from about 20 to about 200 and z is a number in the range of from about 3 to about 100, preferably from about 3 to about 30, and most preferably from about 3 to about 20; and (2) resinous hydrogen-containing siloxane copolymers selected from (a) resinous hydrogen-containing siloxane copolymers comprising by weight:

from about 60% to about 100% of $SiO_{4/2}$ units and $(R^6)_2HSiO_{1/2}$ units; wherein the ratio of $(R^6)_2HSiO_{1/2}$ units to $SiO_{4/2}$ units is from about 0.6:1 to about 2:1; and from 0 to about 40% of $(R^6)_3SiO_{1/2}$ units and $(R^6)_2SiO_{2/2}$ units; and (b)resinous hydrogen-containing siloxane copolymers comprising by weight:

from about 30% to about 100% of $R^5SiO_{3/2}$ units and $(R^6)_2HSiO_{1/2}$ units; wherein the ratio of $(R^6)_2HSiO_{1/2}$ units to $R^5SiO_{3/2}$ units is from about 0.6:1 to about 2:1; and from 0 to about 70% of $(R^6)_3SiO_{1/2}$ units and $(R^6)_2SiO_{2/2}$ units; wherein each $R^6$ is independently a monovalent hydrocarbon radical having form 1 to about 6 carbon atoms, at least 95% of all $R^6$ groups being an alkyl group. Examples of radicals represented by $R^6$ include alkyl radicals such as methyl, ethyl, and isopropyl; cycloaliphatic radicals such as cyclopentyl and cyclohexanyl; olefinic radicals, such as vinyl and allyl; and the phenyl radical. At least, 95% of all $R^6$ groups are alkyl groups, preferably methyl. The molar ratio of $(R^6)_2HSiO_{1/2}$ units to $SiO_{4/2}$ units is from about 0.6:1 to about 2:1. (C)(i)(1) has a viscosity of from about 5 to about 12,000, preferably from about 5 to about 5000, and most preferably form about 5 to about 2500, centipoise at 25° C. The resinous siloxane copolymer (C)(i)(2) has a hydride content of from about 0.005% to about 3.0% by weight. (C)(i)(1) is preferably a hydrogen-containing copolymer such as poly(dimethyl-co-methyl hydrogen) siloxane. (C)(i)(2) is preferably a dimethylhydrogen-containing resinous copolymer crosslinker or a methylhydrogen-containing resinous copolymer crosslinker.

Component (C)(ii) is generally an alkenyl-containing organopolysiloxane having more than 2 silicon-bonded alkenyl groups per chain, or resinous siloxane copolymer having more than 2 silicon-bonded alkenyl atoms per chain and is selected from:

(1) linear alkenyl-containing organopolysiloxane fluids having the general formula

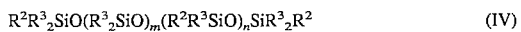 (IV)

where each $R^3$ is independently an alkyl radical having from about 1 to about 10 carbon atoms or an aryl radical; $R^2$ is either $R^3$ or an alkenyl radical having from about 1 to about 10 carbon atoms such as vinyl allyl, propenyl or hexenyl; the sum of m+n is at least about 20, preferably is at least about 100, and most preferably is at least about 250. The weight % of alkenyl groups is defined by the weight % of alkenyl units to the total weight of the organopolysiloxane. This ranges from about 0.005 to about 5.0% by weight, preferably from about 0.05 to about 3.5% by weight, and most preferably from about 0.1 to about 3% by weight of the total weight of organopolysiloxane; and/or (2) resinous alkenyl-containing siloxane copolymers wherein said silicon bonded alkenyl group is a combination of $R^1{}_pR^2{}_qSiO_{1/2}$ or $R^1{}_rR^2{}_sSiO_{2/2}$, $R^3SiO_{3/2}$ and/or $SiO_{4/2}$ containing resinous copolymer where each $R^1$ is independently an alkyl radical having form about 1 to about 10 carbon atoms or an aryl radical; each $R^2$ is independently an alkenyl radical having from about 1 to about 10 carbon atoms such as vinyl, allyl, propenyl or hexenyl; p is 0, 1, 2, or 3; q is 0, 1, 2, or 3; r is 0, 1, or 2; s is 0, 1, or 2; p+q=3; and r+s=2. The weight % of alkenyl groups is defined by the weight % of alkenyl units to the total weight of the organopolysiloxane. This ranges from about 0.005 to about 5.0% by weight, preferably from about 0.01 to about 3.5% by weight, and most preferably from about 0.1 to about 3% by weight of the total weight of organopolysiloxane. Component (C)(ii)(1) is preferably a vinyl-containing copolymer crosslinker. Component (C)(ii)(2) is preferably a dimethylvinyl-containing resinous copolymer crosslinker or a methylvinyl-containing resinous copolymer crosslinker.

The set of silicone crosslinkers (C)(i) and (C)(ii) can be either added separately or as a blend to the adhesive mixture. It is also possible to prepare a dual-functional silicone compound, having both hydrogen and alkenyl functionality, to act as Component (C), the crosslinker.

The amount of (C) present in the composition is to provide generally from about 15 mole percent to about 60 mole percent and preferable from about 20 mole percent to about 50 mole percent of the total hydrosilylation reactive groups in the composition as either silicon-bonded hydrogens (C)(i) or alkenyl groups (C)(ii) and the ratio of the total silicon-bonded hydride of both (B) and (C)(i) to total silicon-bonded alkenyl groups of (C)(ii) being from about 1.1 to about 30.

Component (D) of the composition of the present invention is the reaction product of a mixture comprising from about 60 parts to about 100 parts by weight of Component (A), from about 40 parts to about 0 parts of an alkenyl-containing diorganopolysiloxane, Component (B), having a viscosity of at least 3,000 cops or higher at 25° C., and an optional amount of organic solvent. The mixture of Component (A) and Component (B) is a high viscosity flowable to solid paste material. To facilitate the reaction and workability of the reaction mixture, organic solvents can be added to form a mixture with manageable viscosity. Suitable organic solvents include aromatic hydrocarbons such as toluene and xylene; aliphatic hydrocarbons up to 18 carbon atoms such as hexane, heptane, and dodecane; normal and isoparaffins generally having a boiling point under 250° C., such as isoparaffins with 6 to 18 carbon atoms; aliphatic cyclics such as cyclohexane; alkanol and ethers with higher than 3 carbons atoms. The mixture comprising component (A) and (B) in an organic solvent was further catalyzed with a base catalyst. The base catalyst can be any base catalyst known to the art. Specific examples include NaOH, KOH, silylated hydroxide and the like. The mixture is reacted to form Component (D). This can be accomplished by thermally refluxing the mixture at temperatures higher than 100° C. for a time sufficient to effect reaction. This time is preferably at least 2 hours. After mixture has reacted, the mixture can be neutralized with an acid, and optionally stripped to form a high solids mixture. The acid can be any suitable acid known to the art. Specific examples include phosphoric acid, hydrochloric acid, silylated phosphoric acid and the like.

Component (D) is present in amounts of from 0 to about 100 parts by weight, and may be used in addition to the mixture comprising Components (A), (B), (C)(i), (C)(ii) and (E), or used to replace some or most of Components (A) and (B) as long as the above requirements are satisfied.

Component (E) of the composition of the present invention is a catalyst which promotes the hydrosilation reaction. Useful catalysts for facilitating the hydrosilation curing reaction include precious metal catalysts such as those which use ruthenium, rhodium, palladium, osmium, iridium, and platinum, and complexes of these metals. Examples of suitable hydrosilation catalysts for use in the present invention are disclosed, for example, in U.S. Pat. Nos. 3,159,601 and 3,159,662 (Ashby) 3,220,970 (Lamoreax); 3,814,730 (Karstedt); 3,516,946 (Modic), and 4,029,629 (Jeram); all of the foregoing patents being hereby incorporated by reference herein.

Preferably, the hydrosilation catalyst used in the present invention is a platinum-containing catalyst. Suitable platinum-containing hydrosilation catalyst including any of the well known forms of platinum that are effective for catalyzing the reaction of silicon-bonded hydrogen atoms with silicon-bonded vinyl groups, such as finely divided metallic platinum, platinum on a finely divided carrier such as alumina, compounds of platinum such as chloroplatinic acid and complexes of platinum compounds.

Other suitable platinum-containing hydrosilation catalysts for use in the present invention include the platinum hydrocarbon complexes described in U.S. Pat. Nos. 3,159,601 and 3,159,662 to Ashby, and the platinum alcoholate catalysts described in U.S. Pat. No. 3,220,970 to Lamoreaux, as well as the platinum catalysts of U.S. Pat. No. 4,510,094 to Drahnak. All of the U.S. Patents cited in the instant paragraph are incorporated by reference into the present disclosure.

The hydrosilation catalyst (E) is present in the composition of this invention in an amount sufficient to provide at least 0.1 part by weight metal per one million parts by weight of the combined weight of (A), (B), (C), and (D). Frequently, such small amounts of the catalyst are poisoned by trace amounts of impurities in the composition, so it is advantageous to use the catalyst in such quantities to provide at least 1.0 part per million (ppm). The amount of catalyst is not critical as long as it is an amount sufficient to facilitate the hydrosilation curing reaction.

There may also be an acetylenic, maleate or other known hydrosilation catalyst inhibitor included in the composition to extend the pot-life of the composition. Such inhibitors are well-known to the skilled artisan and described in the patent literature.

Component (F) of the composition of the present invention is an organic solvent. The compositions of the present invention comprise 0 to about 40, preferably from about preferably less than 15 to about 20, and most preferably from about 0 to about 15, percent by weight of (F). Suitable organic solvents include any of the solvents conventionally used with organosiloxanes and having a boiling point below approximately 250° C., such as aromatic hydrocarbons, e.g., toluene, and xylene; aliphatic hydrocarbons containing up to 18 carbon atoms, such as hexane, heptane, and cyclohexane; normal and isoparaffins having boiling point under 250° C. such as isoparaffins having up to 18 carbon atoms from petroleum distillates; halogenated hydrocarbon solvents such as trichloroethane and chloroform; naphthas such as petroleum ether, VM and P Naphtha and refined naphthas such as Naphthalite 66/3 and oxygenated solvents such as hydrocarbon ethers, e.g., tetrahydrofuran and the dimethyl-ether of ethylene glycol; ketones such as methyl isobutyl ketone and esters such as ethyl acetate and the like. Mixture of organic solvents can also be used.

The components of the compositions of this invention can be mixed in any manner such as in bulk or in organic solvent. Since the resin or resinous copolymer (A) is generally a solid, and is conveniently prepared and handled in an organic solvent, the preparation of the composition of this invention preferably uses an organic solvent. The organic solvent can be any of the solvents recited above in connection with component (E). The mixing of the components can be accomplished by any of the techniques known in the art, such as milling, blending, stirring, and the like, either in batch or in continuous process, although the components may be prepared with or without the aid of solvent, by simply mixing (A), (B), (C), (D) and (E). The order of mixing is not critical.

Small amounts of additional ingredients may be added to the composition of this invention if desired. For example, antioxidants, pigments, stabilizers, fillers, and the like, may be added as long as they do not materially reduce the pressure sensitive adhesive properties of these compositions. Volatile additives are preferably added after any solvent removal operations have been completed.

The compositions of this invention are useful as pressure sensitive adhesives and will readily stick to a solid support, whether flexible or rigid. The composition is simply applied to the surface of the support by any suitable coating means such as rolling, spreading, spraying and the like; then cured.

The surface of the support and the substrate to which the support is adhered may be any known solid material such as metals, porous materials, leather, and fabrics, organic polymeric materials, fluorocarbon polymers, silicone elastomers, silicone resins, polystyrene, polyamides, polyimides, polyesters and acrylic polymers, painted surfaces, siliceous materials and glass, and the like.

Useful articles which can be prepared with the PSA's of this invention include PSA tapes, labels, emblems, and other decorative or informative signs, and the like. An especially useful article is one comprising a support, flexible or rigid, that can withstand extreme temperatures, hot and/or cold and carrying at least one surface thereof, the PSA's of this invention. A preferred article is pressure sensitive adhesive over plastic film substrates such as polyester, polyimide, polytetrafluoroethylene and impregnated glass cloth.

In order that those skilled in the art may better understand the present invention, the following examples are given to illustrate but not to limit the invention which is fully delineated by the appended claims.

EXAMPLE 1

Preparation of High Solids Adhesive Base Mixtures

The preparation of the silicone adhesive compositions was facilitated by preparing a batch mixture of an MQ resin and an alkenyl-containing polydiorganosiloxane to about 90% solids level. In some cases, it was desirable to prepare a mixture of (A) and (B) at lower solids level for ease of formulation and subsequent applications.

1A: a mixture comprising 58% by weight MQ resin and 42% by weight vinyl-stopped polydimethylsiloxane. This was prepared by mixing 313.2 grams of an MQ resin ($M_{-0.7}Q$, 60% solids in toluene), 136.1 g of vinyl-containing polydimethylsiloxane (82,000 cps viscosity at 25° C., about 0.064 wt. % vinyl), and 0.648 gram of Karlstedt Pt-catalyst (5% active Pt in xylene), then vacuum stripping to about 90.5 wt. % solids. The resulting mixture had a viscosity of 21,000 cps at 25° C.

1B: a mixture comprising 56% by weight MQ resin and 44% by weight vinyl-stopped polydimethylsiloxane. A mixture was prepared by mixing 280 g of an MQ resin ($M_{-0.7}Q$ at 60% solids in toluene), 132 grams of a vinyl-containing polydimethylsiloxane (82,000 cps viscosity at 25° C., about 0.064 wt. % vinyl), and 0.60 grams of a Karlstedt Pt-catalyst (at 5% active Pt), then vacuum stripped to about 90.8% solids. The resulting mixture had a viscosity of 17,000 cps at 25° C.

1C: a mixture comprising 70% by weight MQ resin and 30% by weight vinyl-stopped polydimethylsiloxane. A mixture was prepared by mixing 326.7 g of an MQ resin ($M_{-0.7}Q$ at 60% solids in toluene), 84 grams of a vinyl-containing polydimethylsiloxane (82,000 cps viscosity at 25° C., about 0.064 wt. % vinyl), and 0.56 gram of 88257 Karlstedt Pt-catalyst (at 5% Pt), then vacuum stripped to about 90.8% solids.

1D: a mixture comprising 58% by weight MQ siloxane resin and 42% by weight vinyl-containing polydimethylsiloxane having 3430 cps viscosity @ 25° C. This mixture was prepared by mixing 199.9 g of vinyl-containing polydimethylsiloxane (3430 cps viscosity @ 25° C., about 0.16% vinyl by weight) with 445.7 g of a devolatized silanol-containing MQ siloxane resin solution (Maq67Q; about 2.1% silanol by weight, and 61.7 wt. % solids in toluene).

The mixture was further vacuum striped to 91.3% solids by weight.

1E: a high solid mixture comprising 58% by weight MQ siloxane resin and 42% by weight vinyl-containing polydimethyl-siloxane having 10,000 cps viscosity @ 25° C. This was prepared by mixing 199.1 g of vinyl-containing polydimethylsiloxane fluid (10,000 cps viscosity @ 25° C.) with 445.7 g of a devolatized silanol-containing MQ siloxane resin solution (M 67Q, about 2.1% silanol by weight, and 61.7 wt. % solids in toluene). The mixture was further stripped under vacuum to 90.9% solids

EXAMPLE 2

Silicone Crosslinkers

Three multi-functional hydride silicones were selected as crosslinkers for the preparation of the addition cure compositions in the following examples. They were Hydride silicone fluid a, a linear hydride silicone fluid ($MD_{20}D^H{}_3M$, 0.16 wt. % H); Hydride silicone fluid b, another linear hydride silicone fluid ($MD_{582}D^H{}_{29.5}M$; 0.064 wt. % H); and Hydride silicone fluid c, a silicone fluid having about 1.6 wt. % H, a general structure of $MD^H{}_xM$ and 20 cps viscosity at 25° C.

Two resinous vinyl siloxanes as crosslinker: a resinous vinyl siloxane, coded vinyl siloxane a, of $MD^{vi}Q$ type structure having about 2.7 wt. % vinyl content was prepared at 60 wt. % solids in toluene. A second vinyl siloxane, vinyl siloxane b, was of $MM^{vi}Q$ structure having about 2.7 wt. % vinyl and made at 60% solids in xylene.

EXAMPLE 3

Resin-rich Silicon Reinforcer

The resin-content in addition cure silicone compositions can be adjusted by two methods; by controlling the amount of Component (A) with respect to the total mixture composition; or by adding to the formulated mixture containing components (A), (B), (C)(i), (C)(ii), and (E) an additional amount of a resin-rich additive. The component (D) resin-rich additive can be selected from the following components:

3A: the product of a bas catalyzed reaction mixture containing 30 parts by weight of a vinyl-containing polydimethylsiloxane gum (approximate structure $MD_{\sim7000}D^{vi}{}_{14}M$;~0.083 wt. % vinyl) and 70 parts by weight of a silanol-bearing MQ resin. The mixture contained 700 g of an MQ resin at 60% solids in toluene, 180 g of a vinyl gum, 120 g of toluene was catalyzed with 0.25 g of a 10% NaOH. The mixture was heated to reflux temperature and held for 3 hours. The mixture was then deactivated with phosphoric acid to a slightly acidic level; the mixture was then stabilized with a trace amount of rare earth octoate and adjusted to about 73.3 wt. % solids.

3B: the product of a based catalyzed reaction mixture containing 20 parts by weight of a vinyl-containing polydimethylsiloxane gum (approximate structure $MQ_{\sim7000}D^{vi}{}_{14}M$;~0.083 wt. % vinyl) and 80 parts by weight of a silanol-bearing MQ resin. The mixture contained 800 g of an MQ resin at 60% solids in toluene, 120 g of a vinyl gum, 80 g toluene was catalyzed with 0.24 g of a 10% NaOH. The mixture was heated to reflux temperature and held for 3 hours. The mixture was then deactivated with phosphoric acid to a slightly acidic level; the mixture was stabilized with a trace amount of rare earth octoate. The final mixture was about 72 wt. % solids having a viscosity about 2900 cps at 25° C.

EXAMPLES 4 AND 5

Two silicone adhesive compositions were prepared according to the teaching in U.S. Pat. No. 4,988,779 (Medford, et al.) using vinyl-containing polydimethylsiloxane of 3430 cps and 10,000 cps viscosity, respectively and hydrogen-containing organosiloxane as crosslinker.

Example 4

This silicone composition contains 56.1% by weight MQ siloxane resin and 33.9% by weight of vinyl-containing silicone fluid of 3430 cps viscosity and a hydride crosslinker combined. This mixture was prepared by mixing 29.57 g of Adhesive Mixture 1D (from Example 1) with 0.90 g of hydride silicone fluid a crosslinker (from Example 2). Then catalyzed with 20 µe of a Pt catalyst solution (@ 5% active Pt) and 0.066 g of dimethyl maleate as inhibitor.

Example 5

This mixture composition contains 56.1% by weight MQ siloxane resin and 33.9% by weight total of a vinyl-containing silicone fluid of 10,000 cps viscosity and a hydride crosslinker. This composition was prepared by mixing 29.70 g of adhesive mixture 1E (from Example 1) with 0.90 g of hydride silicone fluid a crosslinker (from Example 2) then catalyzed the mixture with 20 µe of a Pt solution (@5% active Pt), along with 0.066 g dimethyl maleate as inhibitor.

A 1.5–2.0 mil thick cured adhesive was prepared by coating the catalyzed adhesive mixture onto a 1 mil thick polyimide film, then cured for 3 minutes @ 170° C. The resulted adhesive had a smooth and uniform finish. The 180° peel adhesive against steel plate was measured according to ASTM D-1000 at a 12 in/min rate. The probe tack property was measured on a polyken probe tact test to equipped with a 0.5 probe at 1 second dwell time and a contact pressure of 1000 g per cm². The lap shear strength of the cured adhesive was measured by attaching the adhesive to a clean stainless steel plate, with an 1"×1" overlapping, a 1 kg deadweight was attached to the end of the adhesive tape such that it established an about 2.2 lbs per square inch of steel on the adhesive. The device was then subjected to elevated temperature testing starting @200° F. for 1 hours, then 300° F., 400° F. for 1 hour respectively, then heated up to 500° F. overnight or longer.

The results are shown below:

|  | Peel, oz/in | Probe tack, 9/cm² | Lap Shear, 2.2 lbs/in.² steel |
| --- | --- | --- | --- |
| Example 4 | 22 | 1008 | 1 failed @ 200° F. |
|  |  |  | 1 failed @ 400° F. |
| Example 5 | 22 | 812 | 1 failed @ 200° F. |
|  |  |  | 1 failed @ 500° F. |

EXAMPLES 6 AND 7

Two silicone compositions were prepared according to the present invention using vinyl-containing polydimethylsiloxane of 3430 cps and 10,000 cps viscosity, respectively and dual crosslinker.

Example 6

This silicone composition contains 55% by weight MQ siloxane resin and 45% by weight total of a vinyl-containing silicone fluid of 3430 cps viscosity, and a set of multifunctional crosslinker. The mixture was prepared by mixing 29.57 g of adhesive mixture 1D (from Example 1), 2.50 g hydride silicone fluid b, 1.50 g vinyl siloxane b (both from Example 2), and 5.50 g mixture 3B (from Example 3). The mixture was catalyzed with 20 μe of a Pt solution (@5% active Pt), and 0.066 g dimethyl maleate as inhibitor.

Example 7

This silicone composition contains 55% by weight an MQ siloxane resin and 45% by weight total of a vinyl-containing silicone fluid of 10,000 cps viscosity and a set of multifunctional crosslinker. The mixture was prepared by mixing 29.70 g of adhesive mixture 1E (from Example 1), 2.50 g of hydride silicone fluid b, 1.50 g vinyl siloxane b (both from Example 2), and 5.50 g mixture 3B (from Example 3). The mixture was catalyzed with 20 μe of a Pt solution (@5% active Pt), and 0.066 g dimethyl maleate as inhibitor.

Cured silicone pressure sensitive adhesive tapes over 1 mil polyimide film were prepared according to the procedure described in Examples 4 and 5. The corresponding adhesive properties are shown in the following

|  | Peel, oz/in | Probe Tack, g/cm$^2$ | Lap Shear 2.2 lbs/in$^2$ steel |
| --- | --- | --- | --- |
| Example 6 | 17 | 808 | Passed 500° F., better than 24 hours |
| Example 7 | 17 | 902 | Passed 500° F., better than 24 hrs |

EXAMPLES 8–17

Multifunctional Crosslinker Set and Addition-cured PSA's

This example illustrates the silicone compositions prepared according to the present invention using various components. The specific compositions for each example are shown below with the exception that about 0.10 g dimethyl maleate (DMM) inhibitor was also present.

| Ex. No. | Component 1A | Hydride Silicone b | Vinyl Siloxane b | Component 3A | Component 3B |
| --- | --- | --- | --- | --- | --- |
| 8 | 30.27 g | 1.66 g | 1.01 g | 1.02 g | — |
| 9 | 30.14 g | 2.073 g | 1.59 g | 4.53 g | — |
| 10 | 30.27 g | 1.66 g | 1.01 g | — | 0.625 g |
| 11 | 30.14 g | 2.075 g | 1.59 g | — | 2.84 g |
| 12 | 30.14 g | 2.283 g | 1.384 g | — | 3.10 g |
| 13 | 29.52 g | 2.259 g | 1.743 g | — | 3.691 g |
| 14 | 29.52 g | 2.493 g | 1.507 g | — | 3.96 g |
| 15 | 29.52 g | 2.455 g | 1.884 g | — | 4.69 g |
| 16 | 30.27 g | 2.20 g | 1.33 g | — | 8.04 g |
| 17 | 29.52 g | 2.491 g | 1.513 g | — | 10.14 g |

A 1.5 to 2.0 mil thick cured adhesive over 1 mil polyimide film was prepared and cured for 3 minutes @170° C. The following adhesive properties were determined: peel adhesion against clean steel plate (in accordance with ASTM D1000), probe tack adhesion using a Polyken Probe Tack tester, and the lap shear strength. The lap shear property of an PSA is tested over an 1"×1" area of the adhesive against a clean stainless steel under a 1 Kg static load through a gradient temperature program: one hour holding time at each temperature from 300° F., to 400° F., then ram up to and held @ 500° F. for extended periods. The higher the test temperature and high the dead weight load for the lap shear testing represent harder the testing conditions. X-ker(s) as used in the tables following stands for "crosslinker(s)"

| Ex. No. | Total X-kers, ×10$^{-3}$ mole. | SiH/Si-vinyl Ratio | Peel, oz/in | Tack, gm/cm$^2$ | Lap Shear (2.2 lbs/in$^2$ @ 500° F.) |
| --- | --- | --- | --- | --- | --- |
| 8 | 1.60 | 1.65 | 20.5 | 723 | passed |
| 9 | 2.20 | 1.30 | 20 | 678 | passed |
| 10 | 1.60 | 1.65 | 22 | 720 | passed |
| 11 | 2.20 | 1.30 | 20 | 677 | passed |
| 12 | 2.20 | 1.65 | 21 | 661 | passed |
| 13 | 2.40 | 1.30 | 22.3 | 637 | passed |
| 14 | 2.40 | 1.65 | 18.8 | 547 | passed |
| 15 | 2.60 | 1.30 | 20 | 494 | passed |
| 16 | 2.13 | 1.66 | 27 | 765 | passed |
| 17 | 2.40 | 1.65 | 28 | 580 | passed |

EXAMPLES 18–23

PSA's Prepared from Various Adhesive Mixtures

A series of silicone compositions prepared from various adhesive mixtures from Example 1, linear hydride silicone b (MD$_{582}$D$^H_{29.5}$M; 0.064 wt. % H) and resinous vinyl siloxane b (MM$^{vi}$Q @ 60% solids) are illustrated in the following examples. 0.10 g of DMM was added as inhibitor to each of the formulation. 4.0 g each of the vinyl polymer (82,000 cps viscosity at 25° C.; about 0.064 wt. % vinyl) was added to Examples 22 and 23 to complete the formulation.

The resulting formulations had a total crosslinker concentration of about $2.13 \times 10^{-3}$ mole and a SiH to Si-vinyl ration of about 1.66.

| Ex. No. | Adhesive Base type & amount | Hydride Silicone X-ker b | Vinyl Silicone X-ker b | Reinforcer type & amount |
|---|---|---|---|---|
| 18 | 30.34 g 1A | 2.20 g | 1.33 g | 4.93 g 3B |
| 19 | 30.34 g 1A | 2.20 g | 1.30 g | 5.63 g 3B |
| 20 | 28.98 g 1B | 2.20 g | 1.30 g | 8.08 g 3B |
| 21 | 2898 g 1B | 2.20 g | 1.30 g | 8.81 g 3B |
| 22 | 25.33 g 1C | 2.20 g | 1.30 g | 4.43 g 3A |
| 23 | 23.52 g 1C | 2.20 g | 1.30 g | 5.67 g 3A |

Adhesive films were prepared and tested according to the procedure described in Examples 4–13.

| Ex. No. | Wt. % MQ Resin | Peel, oz/in | Tack, g/cm2 | Lap Shear (2.2 lbs/in$^2$, 500° F.) |
|---|---|---|---|---|
| 18 | 55.2 | 24.0 | 685 | passed |
| 19 | 55.6 | 24.3 | 670 | passed |
| 20 | 55.2 | 24.8 | 654 | passed |
| 21 | 55.6 | 24.3 | 658 | passed |
| 22 | 55.2 | 26 | 404 | passed |
| 23 | 55.6 | 25.5 | 375 | passed |

EXAMPLES 24–25

Other Multi-functional Crosslinker PSA's

Hydride silicone fluid c and vinyl siloxane b from Example 2 were used as the crosslinkers for the following two examples.

Example 24

The composition was made by mixing 30 g of Component 1A from Example 1, 0.375 g of the said hydride fluid c, 0.83 g of vinyl siloxane b crosslinker from Example 2, and 4.0 g of a pure MQ resin solution (@ 78% solids), and 0.375 g of DMM inhibitor.

Example 25

The composition was prepared by mixing 30 g of Component 1A from Example 1, 0.60 g of the said hydride silicone c, 0.83 g vinyl siloxane b from Example 2, and 4.0 g of a pure MQ resin solution (@ 78% solids) as reinforcer, and 0.065 g DMM inhibitor.

| Ex No. | SiH/Si-vinyl Ratio, total | SiH X-ker/Si-vinyl X-ker | Wt. % MQ Resin | Peel, oz/in | Tack, g/cm$^2$ |
|---|---|---|---|---|---|
| 24 | 11.73 | 11.99 | 60.6 | 29 | 312 |
| 25 | 19.35 | 19.41 | 60.1 | 27.5 | 24 |

The lap shear strength of both example adhesives passed the gradient temperature tests overnight under the same testing conditions.

What is claimed is:

1. An addition curable pressure sensitive adhesive silicone composition comprising components (A), (B), (C), optionally (D), (E), and optionally (F) wherein:
    (A) is an aromatic soluble resin or resinous copolymer comprising $R_3SiO_{1/2}$ units and $SiO_{4/2}$ units wherein R is a monovalent alkyl or aromatic radical having from 1 to about 6 carbon atoms, wherein the resinous copolymer comprises from about 0.2% to about 5.0% by weight, based on the total weight of copolymer, of hydroxyl radicals, the molar ratio of $R_3SiO_{1/2}$ to $SiO_{4/2}$ being from about 0.6 to about 0.9 inclusive;
    (B) an alkenyl-containing polydiorganosiloxane having a viscosity of at least about 3,000 centipoise at 25° C.;
    (C) a set of multi-functional silicones as crosslinkers comprising:
        (i) a multi-functional hydride silicone having more than 2 silicon-bonded hydrogens per chain; and
        (ii) a multi-functional resinous alkenyl silicone having more than 2 silicon bonded alkenyl groups per chain wherein the weights of (A), (B), (C (i)), and (C (ii)) add to 100 parts by weight with
        (A) ranging from 50 to 75 parts per hundred parts by weight and the sum by weight of
        (B), (C(i)), and (C(ii)) being the balance to add to 100 parts by weight wherein the quantities of (B), (C(i)), and (C(ii) are determined by the molar ratio of silicon-bonded hydrogen (C(i)) to the molar sum of alkenyl groups in (B) and (C(ii)) being from about 1.1 to 30 and optionally
    (D) from 0 to about 100 parts by weight of a reaction mixture comprising from 60 to 100% by weight of component (A) and from 40 to 0% by weight of component (B) wherein the sum by weight of (A), (B), (C(i)), (C(ii)), and (D) ranges from 100 parts by weight to 200 parts by weight when the sum of (A), (B), (C(i)), and (C(ii)) is 100 parts by weight;
    (E) a hydrosilation catalyst; and optionally
    (F) an organic solvent present in the total composition from about 0 to 40% by weight based on the sum by weight of all components present whereby when said pressure sensitive adhesive silicone is cured the lap shear at 70° C. is 2.2 lbs/in$^2$ or greater.

2. A composition as in claim 1 wherein component (B) is represented by the general formula:

$$R^1_2R^2SiO(R^1_2SiO)_x(R^1R^3SiO)_ySiR^2R^1_2$$

wherein each $R^1$ is independently an alkyl group having from 1 to about 10 carbon atoms, cyclo-aliphatic group or an aryl group, $R^2$ is an alkenyl group having from 2 to about 10 carbon atoms; and $R^3$ is either $R^1$ or $R^2$, and wherein x+y is at least 520.

3. A composition as in claim 1 wherein component (C)(i) is a linear hydrogen-containing polydiorganosiloxane fluid having a viscosity of from about 5 to about 12,000 centipoises at 25° C.

4. A composition as in claim 1 wherein component (C)(i) is resinous hydrogen containing siloxane copolymers.

5. A composition as in claim 1 wherein component (C) (i) is a hydride-containing organosiloxane polymer and component (C) (ii) is a vinyl-containing resinous copolymer selected from the group consisting of dimethylvinyl-containing and methylvinyl-containing resinous copolymers.

6. A composition as in claim 1 wherein component (C)(i) is present in an amount such that component (C)(i) has a silicon-bonded hydrogen content of from about 0.005% to about 3.0% by weight.

7. A composition according to claim 1 wherein component (C) (ii) contains from 0.005% to about 5.0% by weight of alkenyl groups based upon the total weight of alkenyl silicone.

8. A composition as in claim 7 wherein component (C) is present in an amount of from about 15 mole percent to about 60 mole percent of the total hydrosilylation reactive groups.

9. A composition according to claim 1 wherein the ratio of silicon-bonded hydrogen atoms in (C) (i) to alkenyl groups in (B) and (C)(ii) is in the range of from about 1.1 about 15.0.

10. A composition as in claim 1 wherein component (B) is an alkenyl-containing dimethylsilicone.

11. A composition as in claim 1 wherein component (B) is an alkenyl-containing poly-dimethyldiphenylsiloxane or alkenyl-containing poly(dimethyl-co-methyl phenyl)siloxane.

12. A composition as in claim 1 wherein said composition comprises less than 15% by weight of organic solvent (F).

13. A composition according to claim 1 further comprising an inhibitor for the hydrosilation catalyst.

14. A composition according to claim 13 wherein the inhibitor is a dialkylmaleate.

15. A composition according to claim 14 wherein the dialkylmaleate is dimethylmaleate.

16. A pressure sensitive adhesive tape comprising a flexible support having on at least one surface thereof the curable composition of claim 1.

17. A pressure sensitive adhesive tape comprising a flexible support having on at least one surface thereof the cured composition of claim 13.

18. A cured silicone pressure sensitive adhesive comprising the curable silicone composition of claim 1.

* * * * *